(12) United States Patent
Sinha et al.

(10) Patent No.: US 11,648,729 B2
(45) Date of Patent: May 16, 2023

(54) ADDITIVE MANUFACTURING POWDER PARTICLE, METHOD FOR TREATING THE ADDITIVE MANUFACTURING POWDER PARTICLE, AND METHOD FOR ADDITIVE MANUFACTURING

(71) Applicant: The Boeing Company, Chicago, IL (US)

(72) Inventors: Nishant Kumar Sinha, Bangalore (IN); Om Prakash, Bangalore (IN)

(73) Assignee: THE BOEING COMPANY, Chicago, IL (US)

(*) Notice: Subject to any disclaimer, the term of this patent is extended or adjusted under 35 U.S.C. 154(b) by 266 days.

(21) Appl. No.: 16/429,845

(22) Filed: Jun. 3, 2019

(65) Prior Publication Data
US 2020/0376749 A1  Dec. 3, 2020

(51) Int. Cl.
*B29C 64/153* (2017.01)
*B29C 64/314* (2017.01)
*B33Y 40/00* (2020.01)
*B33Y 70/00* (2020.01)
*B33Y 10/00* (2015.01)

(52) U.S. Cl.
CPC .......... *B29C 64/153* (2017.08); *B29C 64/314* (2017.08); *B33Y 10/00* (2014.12); *B33Y 40/00* (2014.12); *B33Y 70/00* (2014.12)

(58) Field of Classification Search
None
See application file for complete search history.

(56) References Cited

U.S. PATENT DOCUMENTS

| | | | | |
|---|---|---|---|---|
| 4,867,573 A | * | 9/1989 | Tsutsui | B01J 19/285 118/620 |
| 5,772,855 A | * | 6/1998 | Johnson | C07B 61/00 435/7.1 |
| 6,582,763 B1 | * | 6/2003 | Nishimura | B22F 1/02 427/216 |
| 8,927,616 B2 | * | 1/2015 | Thomas | C08J 3/28 623/20.14 |

(Continued)

FOREIGN PATENT DOCUMENTS

WO   WO-2017011715 A1 * 1/2017 ............ B22F 3/1028

OTHER PUBLICATIONS

Yanyan Zheng, Chengdong Xiong, Zhecun Wang, Xiaoyu Li, Lifang Zhang, "A combination of CO2 laser and plasma surface modification of poly(etheretherketone) to enhance osteoblast response", Jul. 30, 2015, Applied Surface Science, vol. 344. (Year: 2015).*

(Continued)

*Primary Examiner* — Joseph S Del Sole
*Assistant Examiner* — Margaret B Hayes
(74) *Attorney, Agent, or Firm* — Perman & Green, LLP (57) ABSTRACT

A method for treating additive manufacturing powder particles is provided. The method includes exposing the additive manufacturing powder particles to plasma radiation, where the plasma radiation forms functional groups, on surfaces of the additive manufacturing powder particles, having molecular bonds that vibrate in response to irradiation by laser energy of an additive manufacturing process, and moving the additive manufacturing powder particles to expose the additive manufacturing powder particles to the plasma radiation.

8 Claims, 7 Drawing Sheets

(56) References Cited

U.S. PATENT DOCUMENTS

| | | | |
|---|---|---|---|
| 2005/0288813 A1* | 12/2005 | Yang | B22F 10/20 |
| | | | 700/119 |
| 2008/0014530 A1* | 1/2008 | Kawamura | B82Y 30/00 |
| | | | 430/270.1 |
| 2009/0202739 A1* | 8/2009 | O'Neill | B05D 1/62 |
| | | | 427/562 |
| 2011/0223351 A1* | 9/2011 | Verheyde | B05D 3/0218 |
| | | | 427/535 |
| 2012/0267151 A1* | 10/2012 | Hojo | B22F 1/107 |
| | | | 427/535 |
| 2013/0320274 A1* | 12/2013 | Walters | C01B 32/174 |
| | | | 252/511 |
| 2014/0176076 A1* | 6/2014 | Momo | H01M 4/96 |
| | | | 320/128 |
| 2016/0243517 A1* | 8/2016 | Kitada | A61K 8/044 |
| 2016/0332370 A1* | 11/2016 | Arai | B33Y 30/00 |
| 2017/0021419 A1* | 1/2017 | Ng | B29C 64/295 |
| 2018/0187310 A1* | 7/2018 | Hsieh | H01J 37/32449 |
| 2020/0047500 A1* | 2/2020 | Zhou | B29C 64/295 |
| 2021/0016499 A1* | 1/2021 | Olevsky | H01J 37/32449 |

OTHER PUBLICATIONS

Zheng, "A combination of CO2 laser and plasma surface modification of poly(etheretherketone) to enhance osteoblast response", Dec. 12, 2014, Applied Surface Science, 344, 79-88 (Year: 2014).*

Iriyama et al.; "Plasma-Induced Graft Polymerization onto Powders"; Polymer Journal, vol. 26, No. 1, pp. 109-111 (1994).

\* cited by examiner

ADDITIVE MANUFACTURING POWDER PARTICLE, METHOD FOR TREATING THE ADDITIVE MANUFACTURING POWDER PARTICLE, AND METHOD FOR ADDITIVE MANUFACTURING

BACKGROUND

1. Field

The exemplary embodiments generally relate to additive manufacturing and more particularly to directed energy additive manufacturing and powder particles therefor.

2. Brief Description of Related Developments

Generally, in directed energy additive manufacturing, powder particles are fused together with a directed energy source such as a laser. One type of directed energy additive manufacturing is powder bed manufacturing (one example of which is selective laser sintering or "SLS") where powder particles are spread on a build plate (or on a powder bed formed by a previous layer of powder particles deposited on the build plate) and are then fused together with the directed energy source to form a desired part/article of manufacture (referred to herein as a "structure"). Another type of directed energy additive manufacturing is powder feed manufacturing where powder particles are fed through a deposition head and then melted into a melt pool by a directed energy source of the deposition head. The costs associated with directed energy additive manufacturing remain high, compared with other additive manufacturing techniques such as fused filament fabrication, due to feed material costs (e.g., the powder particles) and costs associated with the energy required for operation of the directed energy source.

SUMMARY

Accordingly, apparatuses and methods intended to address, at least, the above-identified concerns would find utility.

The following is a non-exhaustive list of examples, which may or may not be claimed, of the subject matter according to the present disclosure.

One example of the subject matter according to the present disclosure relates to a method for additive manufacturing comprising: treating additive manufacturing powder particles with plasma radiation; and exposing the additive manufacturing powder particles to laser energy of an additive manufacturing process, where treating the additive manufacturing powder particles with the plasma radiation increases laser energy absorption of the additive manufacturing powder particles.

Another example of the subject matter according to the present disclosure relates to an additive manufacturing powder particle comprising: a surface; and at least one functional group formed on the surface, wherein the at least one functional group increases laser energy absorption of the additive manufacturing polymer particle.

Still another example of the subject matter according to the present disclosure relates to a method for treating additive manufacturing powder particles, the method comprising: exposing the additive manufacturing powder particles to plasma radiation, where the plasma radiation forms functional groups, on surfaces of the additive manufacturing powder particles, having molecular bonds that vibrate in response to irradiation by laser energy of an additive manufacturing process; and, moving the additive manufacturing powder particles to expose the additive manufacturing powder particles to the plasma radiation.

BRIEF DESCRIPTION OF THE DRAWINGS

Having thus described examples of the present disclosure in general terms, reference will now be made to the accompanying drawings, which are not necessarily drawn to scale, and wherein like reference characters designate the same or similar parts throughout the several views, and wherein:

DETAILED DESCRIPTION

Figure 1A:
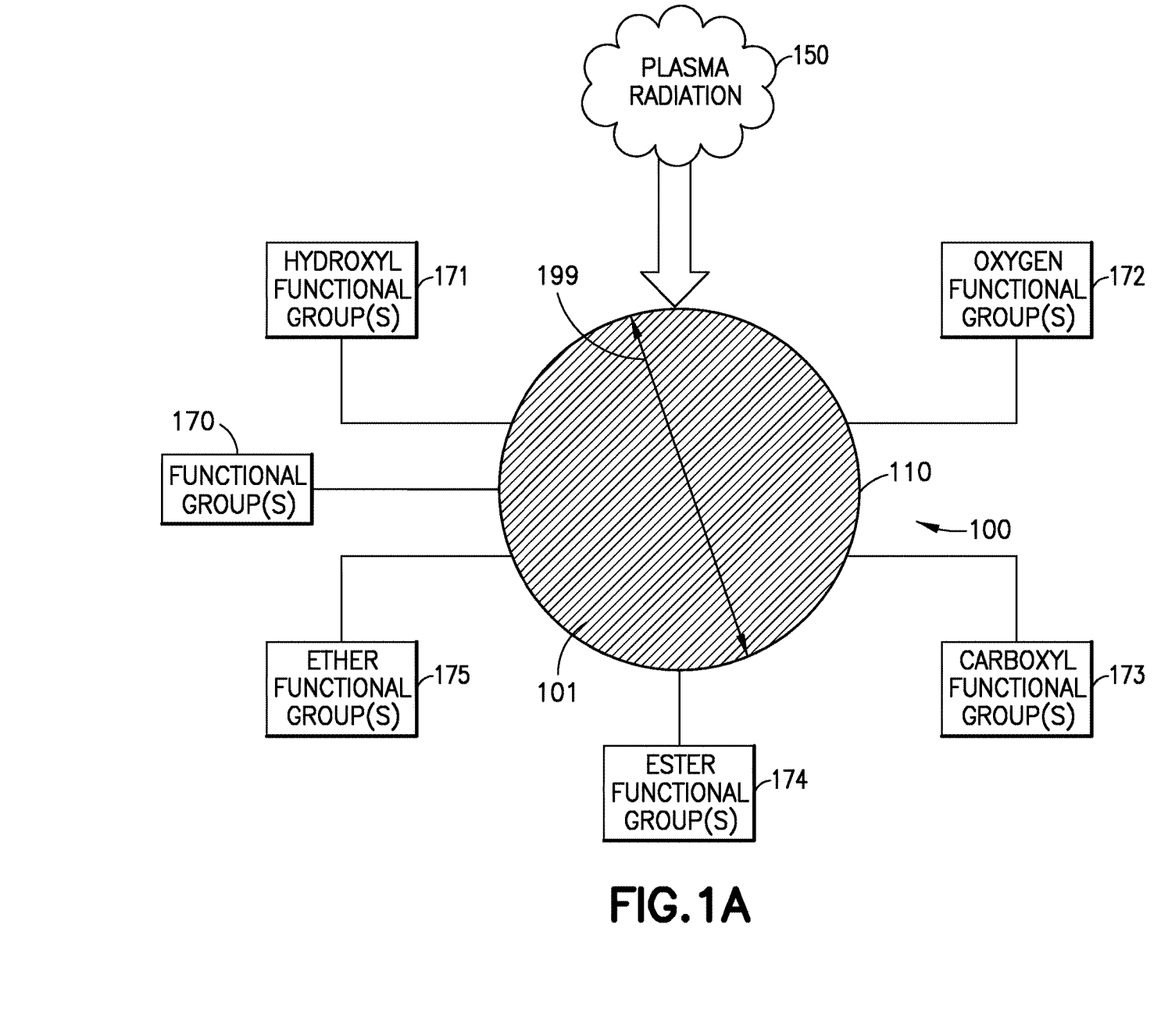
FIG. 1A is a schematic illustration of an additive manufacturing particle in accordance with aspects of the present disclosure.
Figure 2A:
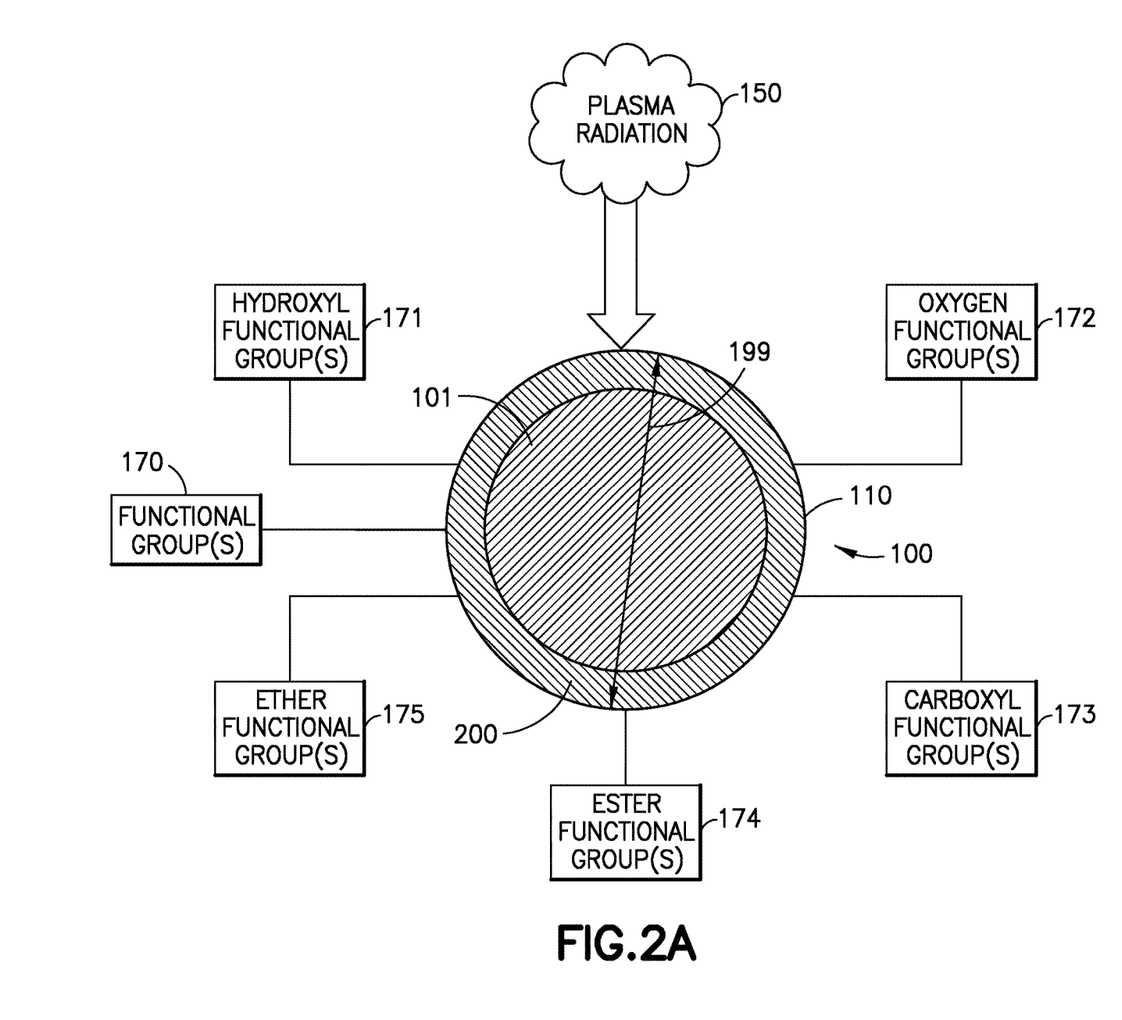
FIG. 2A is a schematic illustration of an additive manufacturing particle in accordance with aspects of the present disclosure.

Referring to FIGS. 1A and 2A, an additive manufacturing powder particle 100 of a group of additive manufacturing particles 410 (see FIGS. 4 and 5) is illustrated. During directed energy additive manufacturing, the additive manufacturing powder particles 410 absorb energy from a directed energy beam 450 (e.g., laser—see FIGS. 4 and 5) to reach a melting temperature of the additive manufacturing powder particles 410. If the absorption of the additive manufacturing powder particles 410 is increased then the energy consumption associated with the additive manufacturing process will be decreased and/or the time required to process a given amount of additive manufacturing powder particles 410 will decrease. The additive manufacturing powder particle 100 of the present disclosure may reduce the costs associated with directed energy additive manufacturing. For example, while additive manufacturing powder particles are generally optimized for, e.g., sintering in terms of thermal and sintering behavior, the additive manufacturing powder particle 100 of the present disclosure is also enhanced, relative to unmodified additive manufacturing powder particles (or particles that have not been chemically functionalized), for energy absorption from a directed energy beam 450 (e.g., laser—see FIGS. 4 and 5) from a directed energy source 451 (see FIGS. 4 and 5). The additive manufacturing powder particle 100 is enhanced in that at least one functional group 170 is formed on a surface 110 of the additive manufacturing powder particle 100 (i.e., the surface of the additive manufacturing powder particle 100 is chemically functionalized). The functional groups are selected depending on a predetermined type of directed energy source being used, so as to increase the energy absorption of the additive manufacturing powder particle 100 when irradiated by the directed energy beam 450 from the directed energy source 451.

A higher absorption of directed energy (at a given wavelength of the predetermined type of directed energy source used) by the additive manufacturing powder particle 100 may provide sintering of the by the additive manufacturing powder particles 410 (FIGS. 4 and 5) with a lower input energy density from the directed energy source 451 (FIGS. 4 and 5) compared to the input energy density required for sintering of additive manufacturing particles that are not chemically functionalized. The higher absorption of directed energy (at a given wavelength of the predetermined type of directed energy source used) by the additive manufacturing powder particle 100 may also decrease additive manufacturing processing times, such as where the directed energy source power is not decreased, which may also reduce costs by virtue of less operating time of the directed energy source.

Aspects of the present disclosure also provide for a method 600 (see FIG. 6) of additive manufacturing that includes treating the additive manufacturing particles 410 (see FIGS. 4 and 5) with a plasma radiation 150 to induce formation of the at least one functional group 170 on the surface 110 of each of the additive manufacturing particles 410. In accordance with aspects of the present disclosure, gas 330 (FIG. 3) may be selected for generating the plasma radiation 150 depending on the type(s) of the at least one functional group 170 that are to be formed on the surface(s) 110 of the additive manufacturing particles 410 (see FIGS. 4 and 5). Aspects of the present disclosure also provide a method 700 (see FIG. 7) for the treatment of the additive manufacturing particles 410 (see FIGS. 4 and 5) to induce formation of the at least one functional group 170 on the surface 110 of the additive manufacturing particles 410.

Figure 1B:
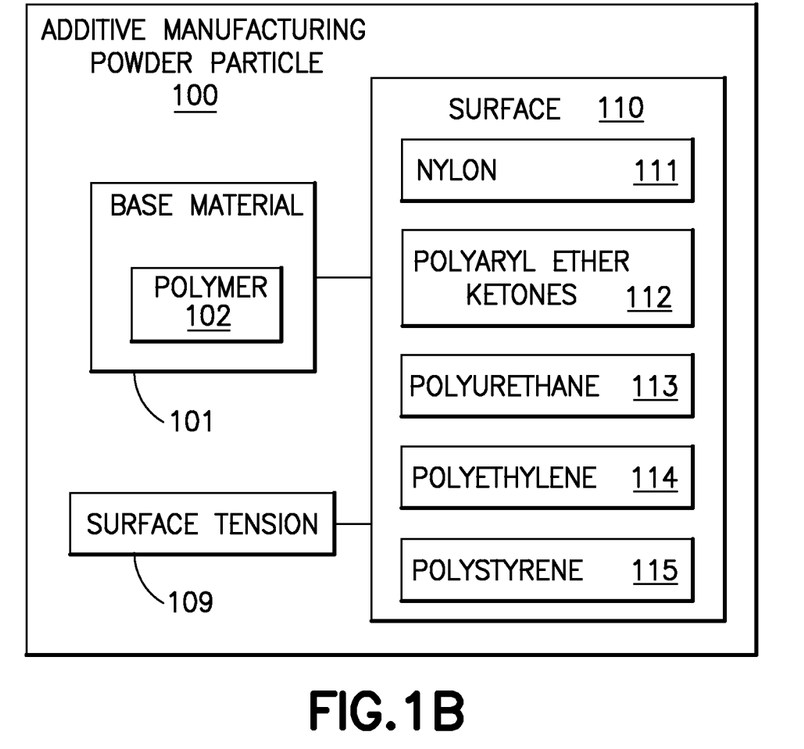
FIG. 1B is a schematic block diagram of the additive manufacturing particle of FIG. 1A in accordance with aspects of the present disclosure.
Figure 1C:
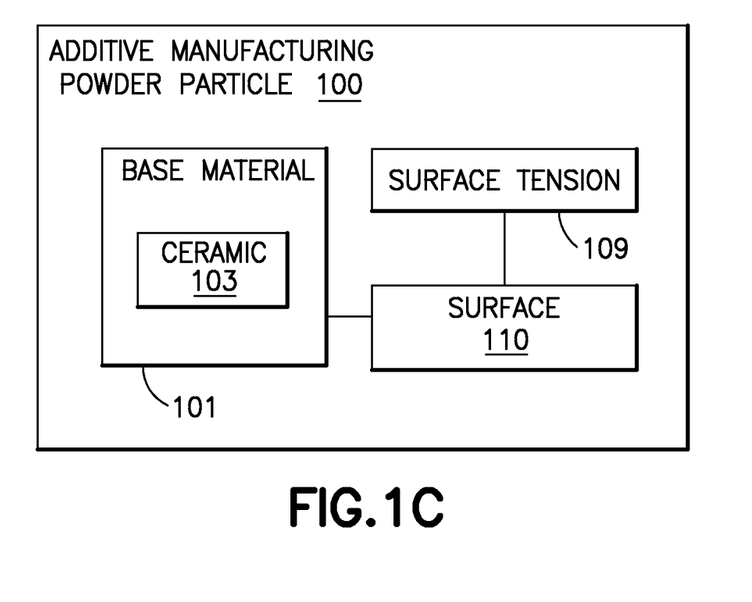
FIG. 1C is a schematic block diagram of the additive manufacturing particle of FIG. 1A in accordance with aspects of the present disclosure.
Figure 3:
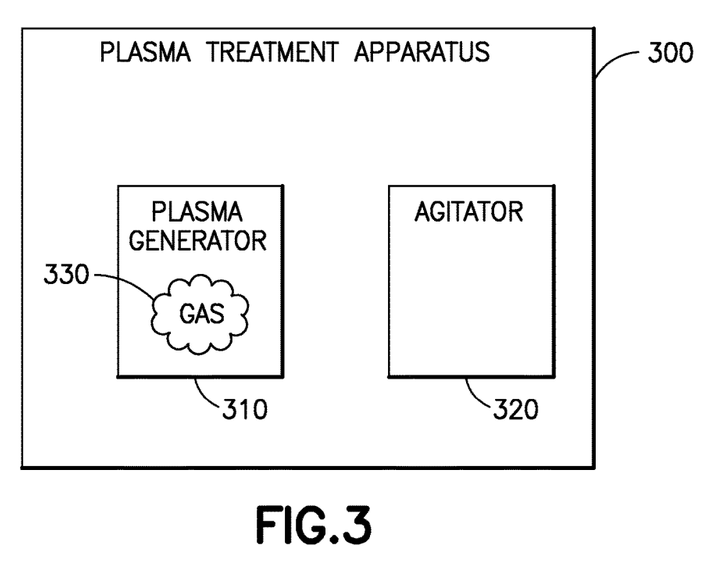
FIG. 3 is a schematic block diagram of a plasma treatment apparatus in accordance with aspects of the present disclosure.

Referring to FIGS. 1A, 1B, and 1C, the additive manufacturing particles 410 (FIGS. 4 and 5) include additive manufacturing powder particle 100 having a uniform composition. In this aspect, uniform composition of the additive manufacturing powder particle means that the particle is formed of only a base material 101. For example, the base material may be a polymer 102 (FIG. 1B); while in other aspects, the base material may be a ceramic 103 (FIG. 3). Where the base material 101 is the polymer 102, the base material 101 (and the surface 110 of additive manufacturing powder particle 100 due to the uniform composition) may be nylon 111 (e.g., Nylon-11, Nylon-12, etc.), polyaryl ether ketones (e.g., such as polyether ether ketone referred to as "PEEK"), polyurethane 113, polyethylene 114, polystyrene 115, or any other polymer suitable for directed energy additive manufacturing.

Figure 2B:
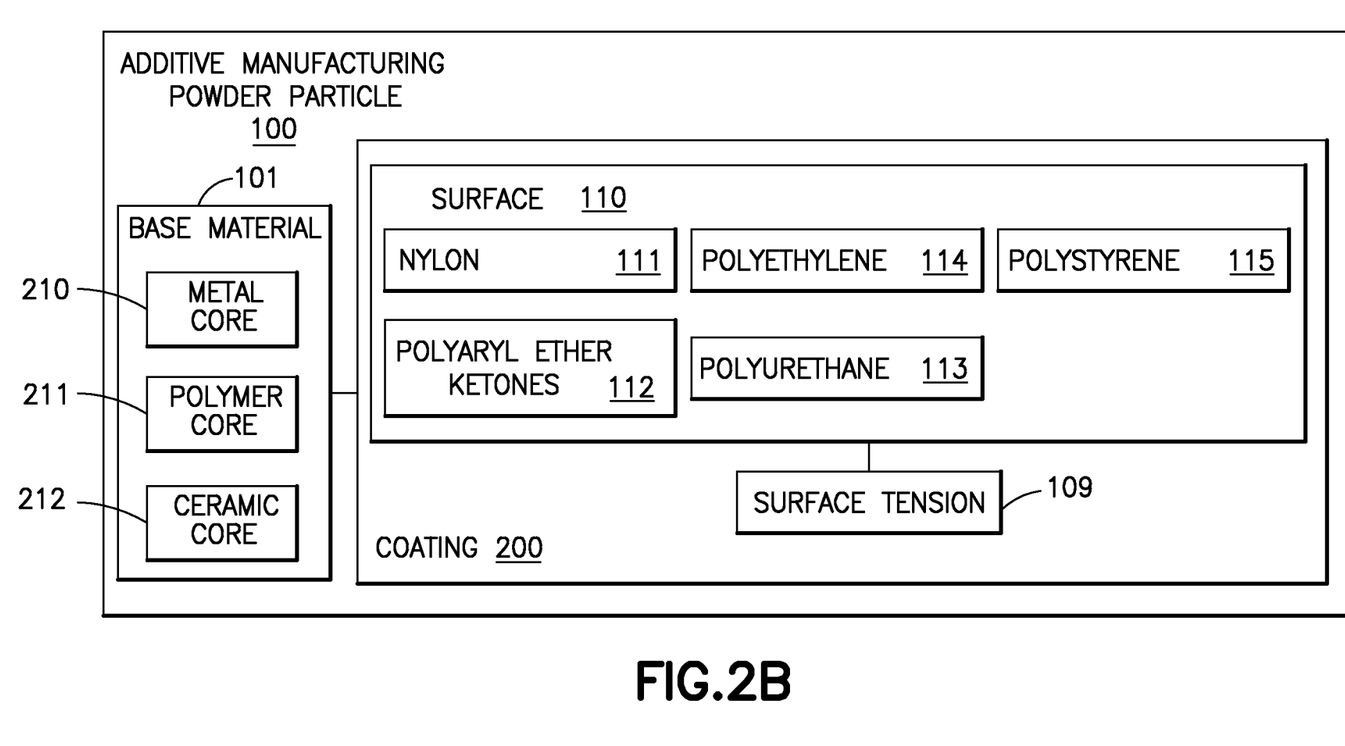
FIG. 2B is a schematic block diagram of the additive manufacturing particle of FIG. 2A in accordance with aspects of the present disclosure.

In another aspect, referring to FIGS. 2A and 2B, the additive manufacturing particles 410 (FIGS. 4 and 5) include additive manufacturing powder particle 100 having a layered composition. In this aspect, the layered composition of the additive manufacturing powder particle means that the particle is formed of a base material 101 with a coating 200 applied over the base material 101. For example, the base material 101 may be a metal core 210, a polymer core 211 (similar to the polymer 102), or a ceramic core 212. The coating 200, applied over the base material 101, forms the surface 110 of the additive manufacturing powder particle 100. The coating 200 (and the surface 110 formed thereby) may be nylon 111 (e.g., Nylon-11, Nylon-12, etc.), polyaryl ether ketones (e.g., such as polyether ether ketone referred to as "PEEK"), polyurethane 113, polyethylene 114, polystyrene 115, or any other polymer suitable for directed energy additive manufacturing. In this aspect, where the base material 101 is a polymer 211, the base material 101 is different type of polymer than that of the coating 200 (e.g., the base material 101 may be nylon 111 and the coating 200 may be polyaryl ether ketones 112).

Referring to FIGS. 1A and 2A, the additive manufacturing powder particle 100 has a diameter 199 between about 10 microns to about 200 microns. In other aspects, the diameter 199 may be larger than about 200 microns or smaller than about 10 microns. The additive manufacturing powder particle 100, for example, where the additive manufacturing powder particle 100 comprises polyethylene, PEEK, or Nylon 11 has an energy absorbance in the range of 0.01-0.1 for a carbon dioxide laser. It is noted the examples provided herein are described with respect to the directed energy beam 450 (FIGS. 4 and 5) being the carbon dioxide laser and the directed energy source 451 being the carbon dioxide laser source; however, the aspects of the present disclosure are not limited to the carbon dioxide laser and may be adapted for use with any suitable directed energy beam 450 generated by any suitable directed energy source 451 (FIGS. 4 and 5).

Still referring to FIGS. 1A and 2A, at least one functional group 170 is formed on the surface 110 of the additive manufacturing powder particle 100. As described above, the at least one functional group 170 increases laser (e.g., directed energy beam) energy absorption of the additive manufacturing polymer particle 100. In particular, the at least one functional group 170 increases laser energy absorption of the additive manufacturing polymer particle 100 for a laser (e.g., directed energy beam 450—FIGS. 4 and 5) having a predetermined wavelength. For exemplary purposes only, the carbon dioxide laser has a wavelength corresponding to a wavenumber between about 940 $cm^{-1}$ and about 1070 $cm^{-1}$. The at least one functional group 170 formed on the surface 110 of the additive manufacturing powder particle 100 may be selected based on a vibrational frequency of the at least one functional group 170. For example, directed energy radiation in the infrared range (e.g., the carbon dioxide laser) may be absorbed by the additive manufacturing powder particle 100. The absorption of the directed energy radiation by the additive manufacturing powder particle 100 is due to vibrations of the functional groups present on the additive manufacturing powder particles.

Depending on characteristics of the functional groups, different additive manufacturing powder particles exhibit high or low absorption of the directed energy radiation. Using the carbon dioxide laser as an example, in accordance with the aspects of the present disclosure, the at least one functional group 170 selected to be induced on the surface of the additive manufacturing powder particle 100 has a vibrational frequency substantially within the range of the vibrational wavenumber of the carbon dioxide laser. For example, hydroxyl functional groups 171 may be selected and have a vibrational wavenumber of about 1100 $cm^{-1}$ and may exhibit increased absorption of the carbon dioxide laser radiation. Other functional group types that may be selected include, but are not limited to, oxygen functional groups 172, carboxyl functional groups 173, ester functional groups 174, and/or ether functional groups 175. In addition, the surface of the additive manufacturing powder particle 100 may be chemically functionalized to include one or more of the oxygen functional groups 172, carboxyl functional groups 173, hydroxyl functional groups 171, ester functional groups 174, and ether functional groups 175.

Figure 4:
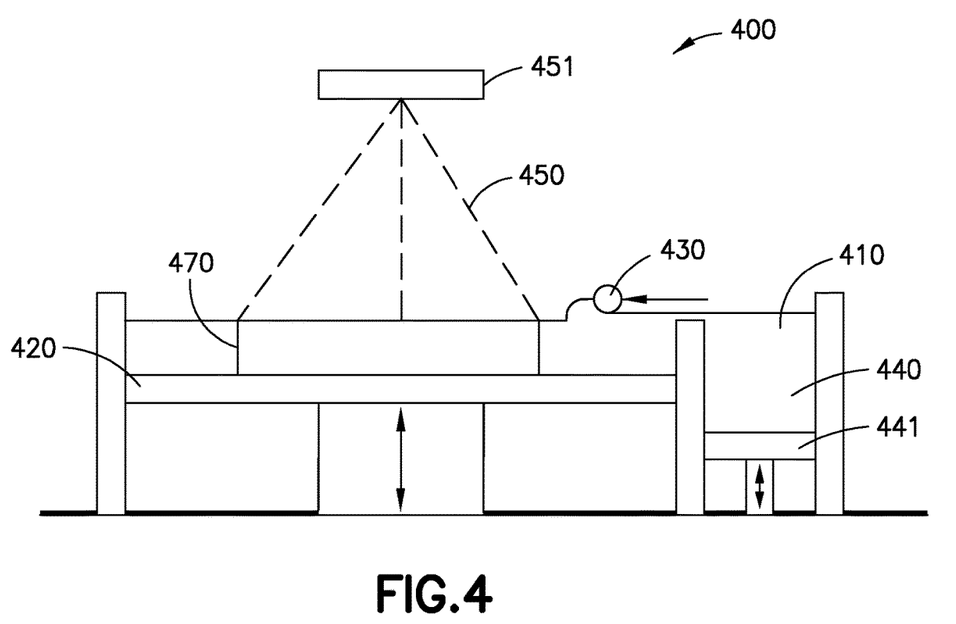
FIG. 4 is a schematic illustration of an additive manufacturing apparatus in accordance with aspects of the present disclosure.
Figure 5:
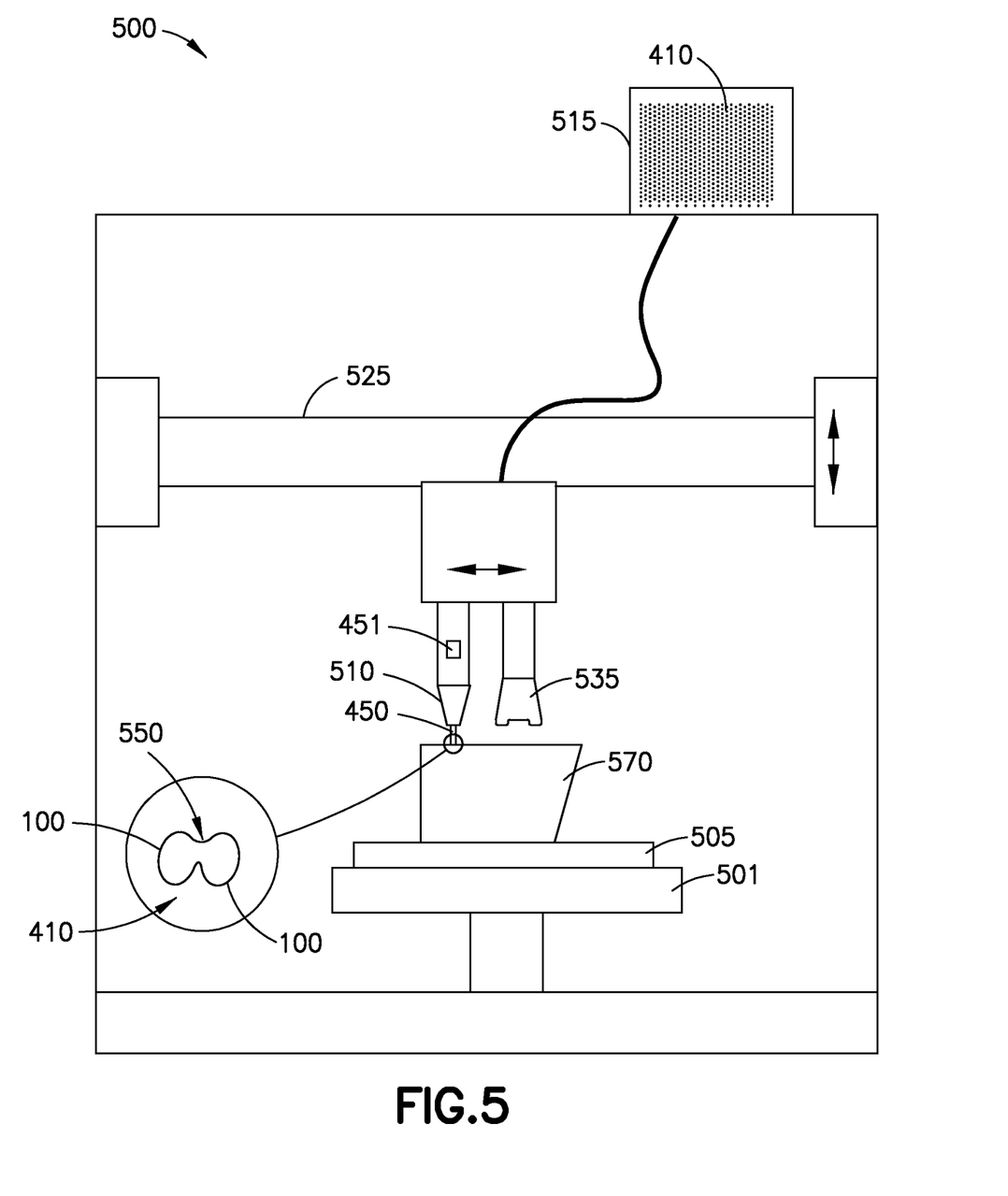
FIG. 5 is a schematic illustration of an additive manufacturing apparatus in accordance with aspects of the present disclosure.

The increased energy absorption of the additive manufacturing powder particle 100 may reduce the energy requirement for the fusion/melting of the additive manufacturing powder particles 410 (FIGS. 4 and 5). For example, using an additive manufacturing powder particle 100 having a diameter of about 60 microns, a surface 110 formed of PEEK (e.g., a material from the polyaryl ether ketones 112 family of materials) and treated with air plasma (e.g., to form at least hydroxyl functional groups 171) on the surface 110, the energy requirement to fuse/melt the additive manufacturing powder particles 410 (FIGS. 4 and 5) may be reduced by about 7%. For example, the energy absorption due to vibration $E_{vib}$ of the C—OH bond of the hydroxyl functional groups 171 is $$E_{vib}=hc/\lambda,$$

where h is Planck's constant, c is the speed of light, and $\lambda$, is the wavelength of the directed energy beam 450 (FIGS. 4 and 5). In this example, the wavelength (e.g., about 9.4 to about 10.6 microns) is that of the carbon dioxide laser. Here, $E_{vib}$ is about 12 kJ/mol. For PEEK, which has a monomer weight of about 288, the air plasma treatment produces about 3 hydroxyl functional groups 171 (e.g., about 17 gm/mol) per PEEK monomer. The at least one functional group (in this case the hydroxyl functional groups 171) is formed on the surface 110 of the additive manufacturing powder particle 100 to a depth of about 10 nm or less (e.g., the treatment depth of the plasma treatment). Here a ratio of a portion of each additive manufacturing powder particle 100 having functional groups formed on a respective surface 110 of the additive manufacturing powder particle 100 to a portion of the additive manufacturing powder particle not exposed to the plasma radiation is about 0.001 (e.g., about 0.1% of the overall volume of an additive manufacturing powder particle 100 having a diameter of about 60 micron). For 1 gm of PEEK additive manufacturing powder particles 410 of the present disclosure, $E_{vib}$ is effectively $$E_{vib}=0.1\%*2.11 \text{ kJ}=0.00211 \text{ kJ}$$

The heat of fusion of 1 gm of conventional PEEK additive manufacturing powder particles is about 0.033 kJ. So, the percentage decrease in the heat of fusion of the PEEK additive manufacturing powder particles 410 of the present disclosure is about 7% less than conventional PEEK additive manufacturing powder particles. The decreased heat of fusion, as described herein, may provide for decreased power requirements with respect to the directed energy source 451 and directed energy beam 450 (FIGS. 4 and 5) and/or decreased additive manufacturing processing times.

As noted above, the at least one functional group (in this case, the hydroxyl functional groups 171) is formed on the surface 110 of the additive manufacturing powder particle 100 to a depth of about 10 nm or less (e.g., the treatment depth of the plasma treatment). The application of the plasma treatment to a depth of about 10 nm or less provides for the at least one functional group 170 increasing a surface tension 109 of the surface 110 relative to another surface without the at least one functional group, where the other surface has a similar material composition to the surface. The increase in surface tension 109 provides for necks 550 (see FIG. 5) between touching additive manufacturing powder particles 100 in the additive manufacturing particles 410 (FIGS. 4 and 5) to form faster than the necks 550 would form if the surfaces 110 were not chemically functionalized in accordance with the aspects the present disclosure.

Referring to FIGS. 1A, 2A, and 3, as also described herein, the gas 330 (FIG. 3) is selected for the plasma treatment of the additive manufacturing powder particles 410 (FIGS. 4 and 5) depending or based on the types of functional groups 170 to be formed on the additive manufacturing powder particles 410. As described herein, the types of functional groups 170 are selected based on, for example, a wavenumber/wavelength range of the directed energy beam 450 used in the additive manufacturing process (i.e., the gas 330 should induce functional groups 170 whose vibrational modes of excitation correspond to the frequency of the directed energy beam 450 being used). The selection of the gas 330 (e.g., type of gas) to produce functional groups 170 whose vibrational modes of excitation correspond to the frequency of the directed energy beam 450 being used may bring down the power/energy requirements for operating the directed energy beam 450 and/or decrease the additive manufacturing processing time compared to additive manufacturing powder particles that are not chemically functionalized. For example, to form at least hydroxyl functional groups 171 for an additive manufacturing process using, e.g., a carbon dioxide laser, air may be selected to for use in any suitable plasma treatment apparatus 300 to produce air plasma. The air plasma may be generated with any suitable plasma generator 310 of the plasma treatment apparatus 300.

Figure 6:
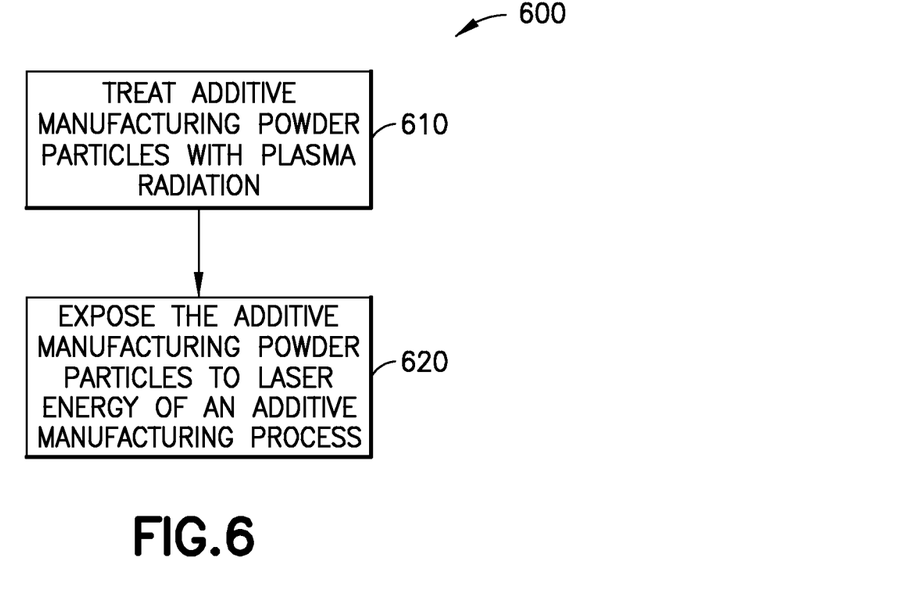
FIG. 6 is a flow diagram of an exemplary method in accordance with aspects of the present disclosure.

Referring to FIGS. 1A, 2A, 4, 5, and 6, a method 600 for additive manufacturing includes treating the additive manufacturing powder particles 410 with plasma radiation 150 (FIG. 6, Block 610). The additive manufacturing powder particles 410 are treated in any suitable plasma treatment apparatus 300 with a gas 330 selected depending on the types of functional groups 170 (e.g., on the type of laser energy/directed energy beam of the additive manufacturing process as described above) to be produced on the surfaces 110 of the individual manufacturing powder particles 100. In one aspect, the additive manufacturing particles 410 are moved or agitated during treatment with the plasma radiation 150. For example, the plasma treatment apparatus 300 includes any suitable agitator (e.g., mechanical vibrator, fluid agitation, sonic vibrator, etc.) that agitates or moves the individual manufacturing powder particles 100, so that substantially an entirety (or some or most) of the surface 110 of each (or at least some or most) of the additive manufacturing powder particles 100 is exposed to the plasma radiation 150. Treating the additive manufacturing powder particles 410 with the plasma radiation 150 forms functional groups 170 on the surfaces 110 of the individual additive manufacturing powder particles 100. As described herein, the functional groups 170 have a molecular vibrational frequency corresponding to a laser wavenumber range of the laser energy/directed energy beam 450 of the additive manufacturing process. Treating the additive manufacturing powder particles 410 with the plasma radiation 150 forms one or more of oxygen functional groups 172, carboxyl functional groups 173, hydroxyl functional groups 171, ester functional groups 174, and ether functional groups 175 on the surfaces 110 of the individual additive manufacturing powder particles 100.

Still referring to FIGS. 1A, 2A, 4, 5, and 6, the method 600 further includes exposing the additive manufacturing powder particles 410 to laser energy (e.g., the directed energy beam 450) of the additive manufacturing process (FIG. 6, Block 620). As described above, treating the additive manufacturing powder particles 410 with the plasma radiation 150 increases laser energy absorption of the additive manufacturing powder particles 410. In one aspect, the additive manufacturing process is a selective laser sintering process performed with a powder bed additive manufacturing process that is effected by a powder bed additive manufacturing apparatus 400 (FIG. 4). For exemplary purposes, the powder bed additive manufacturing apparatus 400 includes a powder bed 420 onto which a powder spreader 430 spreads the additive manufacturing powder particles 410 from a hopper 440. The hopper 440 includes an elevator 441 that raises the powder for extraction by the powder spreader 430. The additive manufacturing powder particles 410 deposited or spread on the powder bed 420 by the powder spreader 430 are sintered by the directed energy beam 450 from the directed energy source 451 to form an additively manufactured part 470. In another aspect, the additive manufacturing process is a directed energy deposition manufacturing process performed with a powder feed additive manufacturing apparatus 500 (FIG. 5). In this aspect, the powder feed additive manufacturing apparatus 500 includes a support table 501. Any suitable substrate 505 is placed on the support table 501. A deposition head 510 of the powder feed additive manufacturing apparatus 500 (which is mounted for movement on a three degree of freedom gantry 525) receives the additive manufacturing powder particles 410 from any suitable hopper 515 and expels the additive manufacturing powder particles 410 towards the substrate 505. As the additive manufacturing powder particles 410 are expelled, the directed energy beam 450 of the deposition head 510 melts the additive manufacturing powder particles 410 into a melt pool onto the substrate 505 (or a layer of material previously deposited by the deposition head 510) to form the additively manufactured part 570. The powder feed additive manufacturing apparatus 500 may include a smoothing head 535 that shapes/compacts the deposited material prior to the deposited material solidifying. In one aspect, the directed energy beam 450 is produced with a carbon dioxide laser source 451 and the additive manufacturing powder particles 410 are chemically functionalized with at least hydroxyl functional groups 171 on surfaces 110 of the additive manufacturing powder particles 410; while in other aspects, the directed energy beam may be produced by any suitable directed energy source and the additive manufacturing powder particles may be chemically functionalized with functional groups corresponding to the directed energy source being used.

Figure 7:
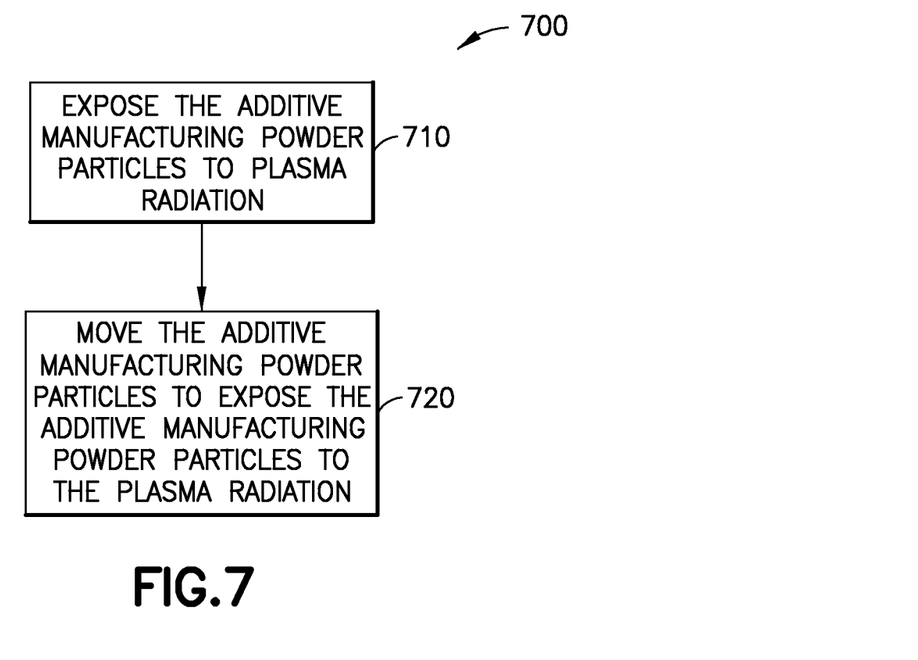
FIG. 7 is a flow diagram of an exemplary method in accordance with aspects of the present disclosure.

Referring to FIGS. 1A, 2A, 4, 5, and 7, a method 700 for treating the additive manufacturing powder particles 410 includes exposing the additive manufacturing powder particles 410 to the plasma radiation 150 (FIG. 7, Block 710). As described herein, the plasma radiation 150 forms functional groups 170 on surfaces 110 of the additive manufacturing powder particles 410. The functional groups 170 may be formed by free-radical based activation, by plasma induced graft polymerization, or in any other suitable manner. The functional groups 170 have molecular bonds that vibrate in response to irradiation by laser energy, such as the directed energy beam 450, of an additive manufacturing process, such as those described above. The plasma radiation 150 is selected so as to form the functional groups 170 depending on a predetermined laser wavenumber range of the laser energy/directed energy beam 450. In one aspect, the plasma radiation 150 is selected so as to form at least hydroxyl functional groups 171 on the surfaces 110 that have molecular bonds that vibrate in response to irradiation by a carbon dioxide laser. In other aspects, the plasma radiation 150 forms one or more of oxygen functional groups 172, carboxyl functional groups 173, ester functional groups 174, hydroxyl functional groups 171, and ether functional groups 175. As described above, a type of the plasma radiation 150 to which the additive manufacturing powder particles 410 are exposed depends on a type of laser energy of the additive manufacturing process. In one aspect, a type of the plasma radiation 150 to which the additive manufacturing powder particles 410 are exposed is selected based on a selective laser sintering additive manufacturing process, such as described herein.

The method 700 also includes moving the additive manufacturing powder particles 410 to expose the additive manufacturing powder particles 410 to the plasma radiation 150 (FIG. 7, Block 720). As described herein, the additive manufacturing particles 410 are treated in the plasma treatment apparatus 300 (FIG. 3) and are agitated or moved by the agitator 320 (FIG. 3) to substantially expose respective surfaces 110 of individual additive manufacturing powder particles 100 to the plasma radiation 150.

The following are provided in accordance with the aspects of the present disclosure:

A1. A method for additive manufacturing comprising:
treating additive manufacturing powder particles with plasma radiation; and
exposing the additive manufacturing powder particles to laser energy of an additive manufacturing process, where treating the additive manufacturing powder particles with the plasma radiation increases laser energy absorption of the additive manufacturing powder particles.

A2. The method of paragraph A1, further comprising forming, with the plasma radiation, functional groups on surfaces of the additive manufacturing powder particles with the plasma radiation.

A3. The method of paragraph A2, wherein the functional groups have a molecular vibrational frequency corresponding to a laser wavenumber range of the laser energy of the additive manufacturing process.

A4. The method of paragraph A2, wherein a ratio a portion of each additive manufacturing powder particle having functional groups formed on a respective surface of the additive manufacturing powder particle to an untreated portion of the additive manufacturing powder particle is about 0.001.

A5. The method of any one of paragraphs A1-A4, wherein treating the additive manufacturing powder particles increases a surface tension of the additive manufacturing powder particles relative to untreated additive manufacturing powder particles having a similar material composition to the additive manufacturing powder particles.

A6. The method of any one of paragraphs A1-A5, wherein treating the additive manufacturing powder particles with plasma radiation includes agitating the additive manufacturing powder particles.

A7. The method of any one of paragraphs A1-A6, wherein a type of the plasma radiation treating the additive manufacturing powder particles depends on a type of laser energy of the additive manufacturing process.

A8. The method of any one of paragraphs A1-A6, wherein the plasma radiation is selected so as to form functional groups, on surfaces of the additive manufacturing powder particles, depending on a predetermined laser wavenumber range of the laser energy.

A9. The method of any one of paragraphs A1-A8, wherein the additive manufacturing process is a selective laser sintering additive manufacturing process.

A10. The method of any one of paragraphs A1-A9, wherein treating the additive manufacturing powder particles with plasma radiation includes exposing respective surfaces of individual additive manufacturing powder particles to the plasma radiation.

A11. The method of any one of paragraphs A1-A10, wherein powder particles are polymer powder particles.

A12. The method of any one of paragraphs A1-A10, wherein powder particles are and polymer-coated metal powder particles.

A13. The method of any one of paragraphs A1-A10, wherein the powder particles are ceramic powder particles.

A14. The method of any one of paragraphs A1-A10, wherein powder particles are and polymer-coated ceramic powder particles.

A15. The method of any one of paragraphs A1-A14, wherein treating the additive manufacturing powder particles with the plasma radiation forms ester functional groups on surfaces of the additive manufacturing powder particles.

A16. The method of any one of paragraphs A1-A14, wherein treating the additive manufacturing powder particles with the plasma radiation forms oxygen functional groups on surfaces of the additive manufacturing powder particles.

A17. The method of any one of paragraphs A1-A14, wherein treating the additive manufacturing powder particles with the plasma radiation forms carboxyl functional groups on surfaces of the additive manufacturing powder particles.

A18. The method of any one of paragraphs A1-A14, wherein treating the additive manufacturing powder particles with the plasma radiation forms hydroxyl functional groups on surfaces of the additive manufacturing powder particles.

A19. The method of any one of paragraphs A1-A14, wherein treating the additive manufacturing powder particles with the plasma radiation forms ether functional groups on surfaces of the additive manufacturing powder particles.

A20. The method of any one of paragraphs A1-A14, wherein treating the additive manufacturing powder particles with the plasma radiation forms one or more of oxygen functional groups, carboxyl functional groups, hydroxyl functional groups, ester functional groups, and ether functional groups on surfaces of the additive manufacturing powder particles.

A21. The method of any one of paragraphs A1-A14, further comprising producing the laser energy with a carbon dioxide laser, wherein treating the additive manufacturing powder particles with plasma radiation forms hydroxyl functional groups on surfaces of the additive manufacturing powder particles.

B1. An additive manufacturing powder particle comprising:
a surface; and
at least one functional group formed on the surface, wherein the at least one functional group increases laser energy absorption of the additive manufacturing polymer particle.

B2. The additive manufacturing powder particle of paragraph B1, wherein the at least one functional group increases laser energy absorption of the additive manufacturing polymer particle for a laser having a predetermined wavelength.

B3. The additive manufacturing powder particle of paragraph B1 or B2, further comprising a metallic core.

B4. The additive manufacturing powder particle of paragraph B1 or B2, further comprising a ceramic core.

B5. The additive manufacturing powder particle of any one of paragraphs B1-B4, wherein the surface comprises Nylon.

B6. The additive manufacturing powder particle of any one of paragraphs B1-B4, wherein the surface comprises polyaryl ether ketones.

B7. The additive manufacturing powder particle of any one of paragraphs B1-B4, wherein the surface comprises polyethylene.

B8. The additive manufacturing powder particle of any one of paragraphs B1-B4, wherein the surface comprises polyurethane.

B9. The additive manufacturing powder particle of any one of paragraphs B1-B4, wherein the surface comprises polystyrene.

B10. The additive manufacturing powder particle of any one of paragraphs B1-B10, comprising a diameter of about 10-200 microns.

B11. The additive manufacturing powder particle of any one of paragraphs B1-B10, wherein the at least one functional group is formed on the surface to a depth of about 10 nm or less.

B12. The additive manufacturing powder particle of any one of paragraphs B1-B11, wherein the at least one functional group increases a surface tension of the surface relative to another surface without the at least one functional group, where the other surface has a similar material composition to the surface.

B13. The additive manufacturing powder particle of any one of paragraphs B1-B12, wherein the at least one functional group includes ester functional groups.

B14. The additive manufacturing powder particle of any one of paragraphs B1-B12, wherein the at least one functional group includes oxygen functional groups.

B15. The additive manufacturing powder particle of any one of paragraphs B1-B12, wherein the at least one functional group includes carboxyl functional groups.

B16. The additive manufacturing powder particle of any one of paragraphs B1-B12, wherein the at least one functional group includes hydroxyl functional groups.

B17. The additive manufacturing powder particle of any one of paragraphs B1-B12, wherein the at least one functional group includes ether functional groups.

B18. The additive manufacturing powder particle of any one of paragraphs B1-B12, wherein the at least one functional group includes one or more of oxygen functional groups, carboxyl functional groups, hydroxyl functional groups, ester functional groups, and ether functional groups.

C1. A method for treating additive manufacturing powder particles, the method comprising:
exposing the additive manufacturing powder particles to plasma radiation, where the plasma radiation forms functional groups, on surfaces of the additive manufacturing powder particles, having molecular bonds that vibrate in response to irradiation by laser energy of an additive manufacturing process; and
moving the additive manufacturing powder particles to expose the additive manufacturing powder particles to the plasma radiation.

C2. The method of paragraph C1, wherein the plasma radiation is selected so as to form the functional groups depending on a predetermined laser wavenumber range of the laser energy.

C3. The method of paragraphs C1 or C2, wherein moving the additive manufacturing powder particles exposes respective surfaces of individual additive manufacturing powder particles to the plasma radiation.

C4. The method of any one of paragraphs C1-C3, wherein a ratio of a portion of each additive manufacturing powder particle having functional groups formed on a respective surface of the additive manufacturing powder particle to a portion of the additive manufacturing powder particle not exposed to the plasma radiation is about 0.001.

C5. The method of any one of paragraphs C1-C4, wherein exposing the additive manufacturing powder particles to plasma radiation increases a surface tension of the additive manufacturing powder particles relative to untreated additive manufacturing powder particles having a similar material composition to the additive manufacturing powder particles.

C6. The method of any one of paragraphs C1-O5, wherein a type of the plasma radiation to which the additive manufacturing powder particles are exposed depends on a type of laser energy of the additive manufacturing process.

C7. The method of any one of paragraphs C1-O5, wherein a type of the plasma radiation to which the additive manufacturing powder particles are exposed is selected based on a selective laser sintering additive manufacturing process.

C8. The method of any one of paragraphs C1-C7, wherein moving the additive manufacturing powder particles includes agitating the additive manufacturing powder particles.

C9. The method of any one of paragraphs C1-C8, wherein powder particles are polymer powder particles.

C10. The method of any one of paragraphs C1-C8, wherein powder particles are and polymer-coated metal powder particles.

C11. The method of any one of paragraphs C1-C8, wherein the powder particles are ceramic powder particles.

C12. The method of any one of paragraphs C1-C8, wherein powder particles are and polymer-coated ceramic powder particles.

C13. The method of any one of paragraphs C1-C12, wherein the plasma radiation is selected so as to form hydroxyl functional groups, on the surfaces, that have molecular bonds that vibrate in response to irradiation by a carbon dioxide laser.

C14. The method of any one of paragraphs C1-C12, wherein the plasma radiation forms oxygen functional groups on the surfaces of the additive manufacturing polymer powder particles.

C15. The method of any one of paragraphs C1-C12, wherein the plasma radiation forms carboxyl functional groups on the surfaces of the additive manufacturing powder particles.

C16. The method of any one of paragraphs C1-C12, wherein the plasma radiation forms hydroxyl functional groups on the surfaces of the additive manufacturing powder particles.

C17. The method of any one of paragraphs C1-C12, wherein the plasma radiation forms ether functional groups on the surfaces of the additive manufacturing powder particles.

C18. The method of any one of paragraphs C1-C12, wherein the plasma radiation forms one or more of oxygen functional groups, carboxyl functional groups, ester functional groups, hydroxyl functional groups, and ether functional groups.

C19. The method of any one of paragraphs C1-C12, wherein the plasma radiation forms ester functional groups on the surfaces of the additive manufacturing powder particles.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 6 and 7, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 6 and 7 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for additive manufacturing comprising:
treating additive manufacturing powder particles with plasma radiation, where treating the additive manufacturing powder particles with plasma radiation includes agitating the additive manufacturing powder particles with a mechanical vibrator, a sonic vibrator, or fluid agitation so as to physically change orientations of respective additive manufacturing powder particles relative to the plasma radiation;
exposing the treated additive manufacturing powder particles to laser energy of an additive manufacturing process so as to fuse the treated additive manufacturing particles to each other, where treating the additive manufacturing powder particles with the plasma radiation increases laser energy absorption of the additive manufacturing powder particles;
forming, with the plasma radiation, functional groups on surfaces of the additive manufacturing powder particles with the plasma radiation, where the functional groups have a molecular vibrational frequency corresponding to a laser wavenumber range of the laser energy of the additive manufacturing process; and
producing the laser energy with a carbon dioxide laser, wherein treating the additive manufacturing powder particles with plasma radiation forms hydroxyl functional groups on surfaces of the additive manufacturing powder particles;
wherein the plasma radiation treating the additive manufacturing powder particles depends on the laser energy of the additive manufacturing process.

2. The method of claim 1, wherein the additive manufacturing powder particles are agitated by the mechanical vibrator, the sonic vibrator, or the fluid agitation so that an entire surface of the respective additive manufacturing powder particles is exposed to the plasma radiation.

3. The method of claim 1, wherein treating the additive manufacturing powder particles with the plasma radiation forms one or more of oxygen functional groups, carboxyl functional groups, hydroxyl functional groups, ester functional groups, and ether functional groups on surfaces of the additive manufacturing powder particles.

4. The method of claim 1, wherein the additive manufacturing process is a selective laser sintering additive manufacturing process.

5. The method of claim 1, wherein the additive manufacturing powder particles are one of: polymer powder particles, polymer-coated metal powder particles, ceramic powder particles, or polymer-coated ceramic powder particles.

6. The method of claim 1, wherein the additive manufacturing powder particles are polymer powder particles or polymer-coated metal powder particles.

7. The method of claim 1, wherein the additive manufacturing powder particles are ceramic powder particles.

8. The method of claim 1, wherein the additive manufacturing powder particles are polymer-coated ceramic powder particles.

* * * * *